United States Patent [19]

Lauzon

[11] Patent Number: 4,507,210

[45] Date of Patent: Mar. 26, 1985

[54] METHOD OF DETERMINING THE OPTIMUM AQUEOUS COMPOSITION FOR PREVENTING THE SWELLING AND DISPERSION OF SUBTERRANEAN FORMATION PARTICLES

[75] Inventor: Rodrigue V. Lauzon, Taylor Lake Village, Tex.

[73] Assignee: Venture Innovations, Inc., Lafayette, La.

[21] Appl. No.: 503,625

[22] Filed: Jun. 13, 1983

[51] Int. Cl.$^3$ ................................................. C09K 7/00
[52] U.S. Cl. .................................... 252/8.5 A; 106/900
[58] Field of Search .......................... 252/8.5 A, 8.511; 106/900

[56] References Cited

U.S. PATENT DOCUMENTS

| | | | |
|---|---|---|---|
| 3,843,524 | 10/1974 | Perricone | 252/8.5 A |
| 3,989,630 | 11/1976 | Walker | 252/8.5 A |
| 4,240,915 | 12/1980 | Block | 252/8.5 A |
| 4,425,165 | 1/1984 | Bryhn et al. | 106/900 |
| 4,425,241 | 1/1984 | Swanson | 252/8.5 A |
| 4,442,241 | 4/1984 | Drake et al. | 252/8.5 A |

OTHER PUBLICATIONS

Chem. Abst. 66:108,537 g; Hall, E. S., *Electrokinetic study of Dispersions of Clay in Hydrolyzed Aluminum Solution*, 1966.
Chem. Abst. 55:16974d; Oaks, *Solids Concentration Effects In Bentonite Drilling Fluids*, 1961.

*Primary Examiner*—Theodore Morris
*Attorney, Agent, or Firm*—Roy F. House

[57] ABSTRACT

Disclosed is a process of formulating an aqueous medium to minimize the swelling and dispersion of subterranean formations contacted by the aqueous medium, particularly the aqueous phase of a water base drilling fluid. The process comprises: measuring a filtration property of a series of aqueous slurries containing particles of the subterranean formation and various concentrations of a water soluble compound which inhibits the swelling or dispersion of shales to determine the concentration range of the compound which maximizes the filtration rate; measuring a filtration property or the zeta potential of a series of aqueous slurries having a varying pH in the range from about 8 to about 13 to determine the pH range which either maximizes the filtration rate or provides a zeta potential in the range of about −10 millivolts to about +20 millivolts, respectively; and utilizing the concentration range of the compound and the pH range to formulate the aqueous medium.

9 Claims, No Drawings

METHOD OF DETERMINING THE OPTIMUM AQUEOUS COMPOSITION FOR PREVENTING THE SWELLING AND DISPERSION OF SUBTERRANEAN FORMATION PARTICLES

BACKGROUND OF THE INVENTION

Maintaining a stable borehole is one of the major problems encountered in drilling oil and gas wells. Hole instability is evidenced by the squeezing of soft, ductile formations into the borehole, the spalling under stress of hard, brittle formations, and the slumping and caving of shales, with consequent hole enlargement, bridges of cavings, and fill during trips into and out of the borehole. These problems increase the drilling time and thus the cost of drilling a well, and may result in stuck drill pipe and sidetracked borehole.

The various forms of hole instability resulting from the interaction between the drilling fluid and the subterranean formations penetrated by the borehole are believed to be related to the hydration and dispersion of the argillaceous sediments. Water is sorbed on clays by two mechanisms; adsorption of monomolecular layers of water on the planar surfaces of clay crystal lattices (commonly referred to as crystalline swelling or surface hydration), and osmotic swelling resulting from the high concentration of ions held by electrostatic forces in the vicinity of the clay surfaces. Crystalline swelling is exhibited by all clays. The water is strongly held but the increase in bulk volume is comparatively small. Interlayer osmotic swelling occurs only with certain clays of the smectite group, and causes large increases in bulk volume.

Where argillaceous sediments are compacted by the weight of overlying sediments, water adsorbed clay minerals is expelled along with pore water. The amount of water remaining in the subsurface sediments depends on the depth of burial; the species and amounts of clay minerals present in the sediment; the exchange cations thereon; and the geologic age of the formation. When the stable is penetrated by the bit, the horizontal earth stresses on the walls of the hole are relieved and the shale adsorbs water from the drilling fluid. If the swelling pressure thus developed increases the hoop stress above the yield stress, the hole is destabilized. This destabilization takes the form of plastic yielding when predominately sodium montmorillonite sediments are contacted by fresh water fluids.

Caving and hole enlargement are frequently experienced in the older, consolidated shales that contain no montmorillonite. It has been shown that these shales can develop extremely high swelling pressures when confined and contacted with water. This swelling pressure increases the hoop stress around the borehole. When the hoop stress at the wall of the hole exceeds the yield stress of the shale, hydrational spalling occurs. It has often been observed that severe caving does not occur until several days after the shale is penetrated by the bit.

Since borehole hydration is, in many cases, the prime cause of hole instability, and in many other cases a contributing factor, every effort must be made to control it.

Laboratory tests have shown that soluble salts must be present in the aqueous phase of water base drilling fluids to reduce the repulsive forces between the clay surfaces, thus reducing the swelling of the clay. Both field and laboratory investigations show that potassium salts are more effective at repressing swelling and dispersion than an equivalent amount of sodium salts. Potassium chloride is the most commonly used potassium salt. The concentration of potassium chloride required to prevent swelling depends on the nature of the shale and on the clay minerals present.

A disadvantage of water base drilling fluids is their tendency to disperse clay formations and drill cuttings, with consequent hole enlargement and accumulation of drilled solids in the mud. Although dispersion is closely associated with swelling, the two phenomena are not identical. Hard consolidated shales can develop high swelling pressures but have little tendency to disperse. Swelling and dispersion of shales have long been inhibited by the use of muds containing lime or gypsum, and thinners—such as tannates or chromelignosulfonates—to offset the flocculating effect of the calcium ion. Although these muds cause much less swelling and dispersion than do sodium muds, they require frequent maintenance treatments, and the sodium hydroxide required to solubilize the thinner partially offsets the inhibiting effect of the calcium ion. Furthermore, because of their relatively high solids content, they retard penetration rates.

Because of these disadvantages, a class of muds known under the general title of low solid or non-dispersed muds have come into increasing favor. These muds rely on polymers and soluble salts to inhibit swelling and dispersion, and on the extensive use of mechanical separators to prevent the accumulation of drilled solids. Usually no thinners are added, and the pH is kept as low as is consistent with the control of corrosion. Commonly used polymers are cellulose derivatives, starch derivatives, polyacrylamide-acrylate copolymers, and xanthan gum. The liquid phase may be potassium, sodium or calcium chloride brine, sea water, or fresh water with a few pounds per barrel of diammonium phosphate.

The mechanism by which the polymers stabilize shales is not known for certain. The commonly used polymers are anionic polyelectrolytes, and starches, which are presumed to be adsorbed on clay aggregates. The polymer bridges the particles together and prevents dispersion of the shale.

Since hole instability is a complex problem, the nature of which depends on the borehole environment, the type of drilling fluid that will provide maximum hole stability therefore varies from area to area.

It has been attempted to base the choice of drilling fluid on a classification of shales according to clay mineral composition and texture. Shales can be classified in a general way to describe their relative tendencies to swell and disperse. Smectite clays have a high tendency to swell and disperse. Illite clays have a much lower tendency to swell and disperse, while the interlayered clays are intermediate to smectites and illites. The swelling and dispersion characteristics of shales has been presumed to be a function of the amounts and types of clays present in the shales. However, the hydration and dispersion characteristics of shales may be considerably different than predicted by a mineralogical classification. Generally these characteristics are worse than predicted by the mineralogical compositions of the shale.

Thus there is a need to develop a method of determining the hydration and dispersion characteristics of the subterranean formations being drilled which will enable the proper inhibited aqueous drilling fluid to be used.

SUMMARY OF THE INVENTION

I have now found a method of formulating an aqueous medium to minimize the swelling and dispersion of shales. The method comprises:

(a) exposing the shale in particulate form to aqueous solutions containing various concentrations of a compound which inhibits the swelling or dispersion of shales:

(b) measuring a filtration property of the aqueous shale-containing medium resulting from step (a);

(c) determining the concentration range of the compound sufficient to maximize the filtration rate of the exposed shale;

(d) immersing the shale in particulate form in aqueous solutions having a pH in the range from about 8 to about 12;

(e) measuring a filtration property of the aqueous shale-containing medium resulting from step (d);

(f) determining the pH range sufficient to maximize the filtration rate of the immersed shale; and (g) utilizing the concentration range of the compound from step (c) and the pH range from step (f) to formulate the aqueous medium.

For low swelling shales, where the filtration rate is always rapid, steps (e) and (f) may be modified as follows:

(e) measuring the zeta potential of the aqueous shale-containing medium resulting from step (d); and (f) determining the pH range sufficient to provide a zeta potential within the range from −10 millivolts to +20 millivolts.

Thus it is an object of this invention to provide a method of characterizing the hydration and dispersion properties of shales in various inhibitive solutions.

It is another object of this invention to provide a method of formulating an aqueous medium to minimize the swelling or dispersion of subterranean formation particles contacted by the aqueous medium.

Still another object of this invention is to provide a method of drilling a well which utilizes a water base drilling fluid in which the aqueous phase is formulated utilizing the methods disclosed herein to provide a drilling fluid which minimizes the instability of the borehole.

These and other objects of this invention will be readily apparent from the description and claims which follow.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The present invention is based on the discovery that certain low swelling argillaceous particles are amphoteric, i.e. the zeta potential of the shale particles change from negative to positive at a certain pH. Near the isoelectric point (pH at which the surface charge is zero), the shale is colloidally unstable and coagulates into larger particles. Thus the filtration rate of an aqueous dispersion of the shale is a maximum at the isoelectric point.

In practice, an argillaceous particle will exhibit minimum dispersion characteristics when contacted with a fluid having a pH at the isoelectric point of the particle. For practical pH control, the pH range of the fluid for minimum dispersion should be in the range where the argillaceous particles exhibit a zeta potential from about −10 millivolts to about +20 millivolts.

Subterranean formation contacting fluids, such as drilling fluids, completion fluids, workover fluids, fracturing fluids, packer fluids, flooding fluids, perforating fluids, sand control fluids, and the like can thus be optimized to exhibit their minimum dispersing effect on the formations contacted by adjusting the pH of the fluids within the range wherein particles of the formation have a zeta potential in the range from about −10 millivolts to about +20 millivolts.

Thus particles of the formations to be drilled, which may be obtained from cores, drill cuttings, etc., are mixed in a series of aqueous solutions of varying pH, preferably in the pH range from about 8 to about 13, and most preferably from about 10 to about 12, and the zeta potential of the particles determined. By this means the pH range in which the particles exhibit a zeta potential from about −10 millivolts to about +20 millivolts is determined. This pH range is advantageously used to formulate a subterranean formation contacting fluid which exhibits a minimum dispersing effect on the formations contacted.

Alternatively, the formation particles can be mixed in water, the zeta potential of the particles measured, and the aqueous mixture titrated with a base while periodically measuring the pH of the mixture and the zeta potential of the particles to obtain a zeta potential v. pH curve.

Thus, in its broadest aspects, the present invention comprises a method of determining the pH range of an aqueous medium to minimize the dispersion of subterranean formation particles contacted by the medium which comprises exposing the particles to aqueous solutions having a pH in the range from about 8 to about 13, measuring the zeta potential of the particles in the solutions, and determining the pH range sufficient to provide a zeta potential in the range from −10 millivolts to +20 millivolts.

A properly formulated aqueous subterranean contacting fluid will exhibit not only a minimum dispersing effect on the formation, it will also exhibit a minimum swelling effect on the formation.

As noted hereinbefore, it is well known that water soluble inorganic salts inhibit the swelling of argillaceous particles. Various means of evaluating the swelling characteristics of argillaceous particles contacted by various aqueous fluids are known. One such method, and a review of other methods, is given by Edwin A. Roehl and James L. Hackett, in SPE paper number 11117, entitled "A Laboratory Technique for Screening Shale Swelling Inhibitors".

I have found a fundamental filtration method which rapidly and efficiently characterizes the swelling and dispersing characteristics of argillaceous particles. This method is useful for determining the concentration range of electrolyte that will produce the maximum inhibiting effect on the particles. The method comprises mixing the argillaceous particles in an aqueous liquid, and measuring the time required for the liquid to travel a calibrated distance on standard porous filter paper (capillary suction time). The filtration measurement is made in a Capillary Suction Time (CST) apparatus. This apparatus comprises a filtration cell, a standard porous filter paper, means for holding the filtration cell in contact with the filter paper, two first electrodes positioned a fixed radial distance from the center of the filtration cell, a second electrode positioned at an extended fixed radial distance from the center of the filtration cell which is thus separated radially from the two first electrodes by a calibrated distance, and means for determining the time of radial travel of a liquid between the electrodes. The timing means consists of a timer which is activated when the liquid contacts the two first electrodes and which is deactivated when the liquid contacts the second electrode. This apparatus is described in a paper by Roy Wilcox and R. V. Lauzon, DRILLING CONTRACTOR, February, 1982, entitled "New Method Helps Troublesome Shales".

The capillary suction time of argillaceous particles decreases (the filtration rate increases) as the degree of swelling of the particles decreases and as the degree of dispersion of the particles decreases. Thus an evaluation of the capillary suction time of mixtures of the argillaceous particles in aqueous solutions containing various concentrations of compounds which inhibit the swelling or dispersion of shales will determine the minimum concentration and optimum concentration range of the compounds for use in contacting the argillaceous particles to inhibit their swelling and dispersing.

The preferred swelling inhibiting compounds are water soluble alkali metal or alkaline earth metal salts, preferably the chloride salts. Preferred cations are potassium and calcium, most preferably potassium. Thus the preferred salts are potassium chloride and calcium chloride.

The preferred dispersion inhibiting compounds are water soluble polymers. The term water soluble is well known in the art to include water dispersible hydrophilic colloidal polymers. Such polymers may be natural polymers (or gums), modified derivatized natural polymers, biopolymers or totally synthetic, and may be anionic, cationic, or non-ionic. Exemplary synthetic polymers, which are most preferably used to inhibit dispersion, are acrylic resins such as polyacrylates, polyacrylamides, partially hydrolyzed polyacrylamides, and copolymers containing two or more monomers in various molar ratios selected from the group consisting of acrylic acid, acrylamide, acrylonitrile, acrylic acid esters, methacrylic acid, methacrylic acid esters, maleic anhydride, maleic acid, vinyl acetate, vinyl sulfonate, sulfonated styrene, and vinyl ethers. Exemplary modified natural polymers are carboxymethyl cellulose, cellulose sulfonate, carboxymethyl hydroxyethyl cellulose, carboxymethyl starch, starch sulfate, starch phosphate, hydroxyethyl starch, hydroxypropyl guar gum, and their alkali metal salts and slightly crosslinked modifications. Exemplary natural polymers include gum ghatti, gum arabic, gum tragacanth, locust bean gum, gum karaya, guar gum, carrageenan, and algin. Exemplary biopolymers useful in this invention are biopolymers produced by a process comprising the microbial transformation of carbohydrate with a microorganism to obtain a polymeric material which differs from the parent polymeric material in respect of composition, properties and structure. Suitable carbohydrates include sugars such as pentoses or hexoses, for example, glucose, sucrose, fructose, maltose, lactose, galactose, and starches, for example, soluble starch, corn starch and the like. Crude products having a high carbohydrate concentration can be used. Among suitable materials there may be mentioned raw sugar, crude molasses and the like. Microorganisms suitable for effecting the microbial transformation of the carbohydrates may be for example plant pathogenic bacteria such as plant pathogens which produce exudates of the site of lesions on infected plants. Typical of such microorganisms are the genus Xanthomonas. Thus, for example, a heteropolysaccharide biopolymer may be prepared from glucose by the action of Xanthomonas campestris (XC polymer). Commerically available xanthan gum biopolymers can be obtained from Kelco Div., Merck & Co., Inc. under the trademark of "Kelzan" and Pfizer, Inc. under the trademark "Flocon". Other species of Xanthomonas bacteria which are useful in preparing the biopolymers include Xanthomonas phaseoli, Xanthomonas mulvacearn, Xanthomonas carotae, Xanthomonas translucens, Xanthomonas hederae and Xanthomonas papavericoli. See for example Jordan U.S. Pat. No. 3,748,201, incorporated herein by reference. Other biopolymers, so-called synthetic gums, which are useful in this invention are: gum dextran synthesized by the action of the bacterium known as genus Leuconostoc Van Tieghemend on sucrose, as described by Bailey et al. in U.S. Pat. No. 2,360,327; phosphorylated mannan synthesized by the action of the yeast Hansenula holstil NRRL-Y2448 on glucose as disclosed in United States Department of Agriculture, Agricultural Research Service, Northern Utilization Research and Development Division, Peoria, Ill., Bulletin CA-N-7, October, 1958; gums produced by the action of diphtheriodic bacteria such as *Arghrobacter viscous* NRRL B-1797 as disclosed in Cadmus et al. U.S. Pat. No. 3,228,855; gum produced by the action of methylomonas mucosa as described in Finn et al. U.S. Pat. No. 3,923,782; gum produced by the action of *Erwinia tahitica* as disclosed in Kang et al. U.S. Pat. No. 3,933,788; and gum produced by the action of *Azotobacter indicus* var. Myxogenes as disclosed in Kang et al. U.S. Pat. No. 3,960,832.

Evaluation of the capillary suction time of mixtures of argillaceous particles in aqueous solutions in which the pH is varied between about 8 and 13, especially 10 to 12, will determine the optimum pH range for minimum shale dispersion.

Thus another embodiment of the invention comprises a method of formulating an aqueous medium to minimize the swelling and dispersion of subterranean formation particles contacted by the medium. This method comprises:

(a) exposing the particles to aqueous solutions containing various concentrations of a compound which inhibits the swelling or dispersion of argillaceous particles;

(b) measuring a filtration property of the exposed particles in the solutions;

(c) determining the concentration range of the compound sufficient to maximize the filtration rate of the exposed particles;

(d) immersing the particles in aqueous solutions having a pH in the range from about 8 to about 13;

(e) measuring a filtration property or the zeta potential of the immersed particles in the solutions;

(f) determining the pH range sufficient to maximize the filtration rate or to provide a zeta potential within the range from −10 millivolts to about +20 millivolts of the immersed particles; and (g) utilizing the concentration range of the inhibiting compound from step (c) and the pH range from step (f) to formulate the aqueous medium.

The shale inhibiting fluids formulated according to the methods of this invention are advantageously utilized as the aqueous phase in drilling fluid, workover fluids, completion fluids, fracturing fluids, and the like. Thus, in a method of drilling a well in which an aqueous fluid is circulated throughout a borehole while simultaneously or periodically rotating a string of drill pipe containing a rotary drill bit on its lower end in contact with the bottom of the borehole, borehole instability is minimized by utilizing a drilling fluid in which the aqueous medium is formulated according to the methods of this invention.

The preferred aqueous drilling fluids of this invention will contain an aqueous phase containing a pH control additive and a compound which inhibits the swelling or dispersion of shale, the pH and concentration of the inhibiting compound being determined by the methods of this invention, a viscosifier, a filtration control additive, and sufficient weight material to provide the desired density. Other common drilling fluids additives such as lubricants, lost circulation materials, defoamers, and the like may be present as necessary to maintain an efficient drilling operation.

Preferred viscosifiers are xanthan gum biopolymer, carboxymethyl cellulose, polyanionic cellulose, prehydrated bentonite, attapulgite, sepiolite, and mixtures thereof. Preferred fluid loss control additives are pregelatinized starch, carboxymethyl cellulose, carboxymethyl starch, hydroxyethyl starch, and their alkali metal or slightly crosslinked modifications. Preferred weight materials are barite, ilmenite, iron oxides such as specular hematite, gelena, calcium carbonate, and the like.

The following examples are illustrative of the application of the present invention to formulate an aqueous shale-contacting fluid such that the swelling and dispersion of the shale in the fluid is minimized.

The filtration rate studies were made using a Capillary Suction Time apparatus, Model 92, using the following procedure:

1. Plug the test head assembly in the test head socket;
2. Ensure that the two blocks of the test head are clean and dry;
3. Place a filter paper on top of the stand, and place the block having the stainless steel probes in it, probe side downwards, on top of the filter paper;
4. Select either the 1 cm. diameter funnel for fast filtering slurries or the 1.8 cm. funnel for slow filtering slurries and insert into the test head. Rotate the funnel applying a light downward pressure when in position to ensure even contact with the filter paper.
5. Switch on apparatus.
6. Press the reset button and note that the counter is zero.
7. Pour the slurry to be tested into the funnel. Liquid from the slurry is absorbed by the filter paper in a circular pattern of increasing diameter. When the liquid front reaches the first pair of contacts the counter starts and timing commences. When the liquid front reaches the third contact timing ceases, and the counter stops. The counter reading is the Capillary Suction Time (CST) in seconds.

Zeta potential (Z.P.) measurements were made with a Laser Zee instrument manufactured by Pen Kem Inc., using the following procedure:

1. Fill the test chamber with the dilute slurry under investigation and place chamber on the instrument.
2. Turn on the laser beam, focus on stationary layer and examine particles. They will vibrate due to Brownian motion.
3. Apply 150 volts; particles will move to the right towards the anode, if negative, and to the left towards the cathode, if positive.
4. Turn the zeta potential knob until the particles seem to be stopped.
5. Read the zeta potential.
6. Repeat several times and take an average.

EXAMPLE 1

0.1% by weight slurries of three shales were prepared in distilled water with a Waring Blendor. The pH and zeta potential (Z.P.) of the slurries was measured. Thereafter the pH was incrementally raised by the addition of NaOH and the Z.P. measured. The electrophoresis cell was washed after each Z.P. determination. The data obtained are given in Table 1.

The shales evaulated were: Shaftesbury, a low swelling shale; Atoka, a medium swelling shale; and a high swelling Marine shale.

EXAMPLE 2

5% by weight slurries of the shales evaluated in Example 1 were prepared in tap water with a Waring Blendor. The Capillary Suction Time (CST) was measured. Thereafter KCl was incrementally dissolved in the slurries and the CST measured. The data obtained are given in Table 2.

EXAMPLE 3

The procedure of Example 2 was repeated except that NaOH or KOH was incrementally dissolved in the slurries instead of the KCl. The data obtained are given in Table 3.

The data in Table 1 indicate that the shales became less electronegative at higher pH after initially becoming more electronegative with an increase in pH. The low swelling Shaftesbury shale was actually electropositive at higher pH. The low and medium swelling shales were coagulated when the pH was between about −10 millivolts and +20 millivolts.

A plot of the data in Table 2 indicates that the minimum concentration of KCl required to inhibit the swelling of these shales is as follows: Shaftesbury-3%; Atoka-4%; Marine-7%.

The data in Table 3 indicate that the swelling and dispersion of the shales was decreased in the presence of NaOH or KOH. Visible redispersion of the shale occurs commencing with 2% NaOH.

EXAMPLE 4

5% by weight of the shales evaluated in Examples 1–3 were prepared in tap water with a Waring Blendor. The minimum concentration of KCl required to inhibit swelling of the shales, as determined in Example 2, was added and the CST measured. Thereafter the concentration of NaOH was incrementally increased and the CST measured. The data are given in Table 4.

EXAMPLE 5

The procedure of Example 2 was repeated with the Shaftesbury shale until 4% KCl had been added. Thereafter the pH of the slurry was incrementally increased with NaOH and the CST measured. The data obtained are given in Table 5.

The data in Tables 4 and 5 indicate that the minimum swelling and dispersion of shale occurs when the concentration of KCl and base are optimized.

EXAMPLE 6

A 1% by weight slurry of Wyoming bentonite was prepared. To a portion of this slurry was added 0.021% by weight of a high molecular weight polyacrylamide polymer. The CST was measured. Thereafter KCl was incrementally added and the CST measured. The data obtained are given in Table 6. The data indicate that only 4% KCl is needed for optimum swelling and dispersion inhibition in the presence of the polyacrylamide whereas 10% KCl is needed to minimize swelling in the absence of the polymer.

EXAMPLE 7

0.05% by weight slurries of Rev-Dust were prepared in distilled water and tap water, and the Z.P. measured. Thereafter the pH was incrementally raised by the addition of NaOH and the Z.P. measured. The data obtained are given in Table 7.

EXAMPLE 8

The procedure of Example 3 was repeated except that a 5% slurry of Rev-Dust was utilized. The data obtained are given in Table 8.

The data in Table 7 indicates that the electrostatic charge characteristics of the particles is completely different in distilled water and tap water. Apparently the cations in the tap water decrease the electronegativity of the particles and renders them electropositive at lower pH values. The data in Table 8 indicate that the swelling and dispersion of the Rev-Dust decreases as the concentration of NaOH is increased until a pH of about 13.5 is reached. Thereafter re-dispersion of the Rev-Dust takes place.

EXAMPLE 9

The procedure of Example 2 was repeated except that calcium chloride was added incrementally instead of KCl. The data obtained are given in Table 9. The data indicate that the shales re-disperse upon increasing the calcium chloride concentration above the minimum amount required to achieve minimum swelling of the shales.

TABLE 1

Effect of pH (NaOH) on the Zeta Potential of Shales
0.1% Shale in Distilled Water

| pH | Z.P., Millivolts | | |
|---|---|---|---|
| | Shaftesbury | Atoka | Marine |
| 8.1 | −14.7 | | |
| 8.3 | | −13.5 | |
| 8.6 | | | −12.8 |
| 8.9 | −16.5 | | |
| 9.1 | | −15.7 | −13.1 |
| 9.6 | | | −14.0 |
| 9.9 | | −15.9 | |
| 10.1 | −17.3 | | −18.6 |
| 10.5 | −19.9 | −20.8 | |
| 10.7 | | | −21.2 |
| 11.0 | | −22.2 | |

TABLE 1-continued

Effect of pH (NaOH) on the Zeta Potential of Shales
0.1% Shale in Distilled Water

| pH | Z.P., Millivolts | | |
|---|---|---|---|
| | Shaftesbury | Atoka | Marine |
| 11.1 | −16.6 | | |
| 11.3 | | | −21.2 |
| 11.5 | | −15.8 | |
| 11.6 | +1.6 | | |
| 11.8 | | −13.4(2) | −20.5(1) |
| 12.0 | +12.0(1) | | −21.3(1) |
| 12.1 | | −1.7(3) | |
| 12.5 | | −4.0(1) | −6.6(1) |
| 12.6 | +20.4(1) | | |

(1)Coagulated
(2)Coagulation begins
(3)Strong coagulation

TABLE 2

Effect of KCl on the Capillary Suction Time of Shales
5% Shale Concentration

| % KCl** | CST, seconds | | |
|---|---|---|---|
| | Shaftesbury | Atoka | Marine |
| 0 | 32.8 | 128.6 | 260.5 |
| 1 | 32.0 | 44.3 | — |
| 2 | 27.2 | 38.8 | 82.0* |
| 3 | 25.4 | 34.4 | — |
| 4 | 24.5 | 29.3 | 57.6* |
| 6 | 24.4 | 28.3 | 51.2* |
| 8 | 21.5 | 24.3 | 48.5* |
| 10 | 22.1 | 23.2 | 48.2* |

*Flocculated
**Minimum KCl required:
Shaftesbury - 3%
Atoka - 4%
Marine - 7%

TABLE 3

Effect of NaOH or KOH on the Capillary Suction Time of Shales
5% Shale Concentration

| % Base | CST, seconds* | | |
|---|---|---|---|
| | Shaftesbury | Atoka | Marine |
| 0 | 39.7 (41.3) | 138.9 | 232.2 |
| 1 | 21.9 (25.6) | 44.3 | 61.9 |
| 2 | 25.7 (23.8) | 45.0 | 73.7 |
| 3 | 28.2 (26.6) | 44.3 | 84.8 |
| 4 | 39.9 (27.0) | 68.1 | 117.3 |
| 6 | 59.9 (35.5) | 112.9 | 160.1 |
| 8 | 81.1 (44.8) | 198.1 | 264.2 |
| 10 | 141.3 (48.7) | 401.7 | 386.5 |

*Values in parentheses are for KOH, others NaOH

TABLE 4

Effect of NaOH on the Capillary Suction Time of
Shales When KCl is Present
5% Shale Concentration

| % NaOH | CSTl, seconds | | |
|---|---|---|---|
| | 3% KCl Shaftesbury | 4% KCl Atoka | 7% KCl Marine |
| 0 | 28.6 | 37.0 | 55.2** |
| 0.5 | 20.5* | 24.9* | 45.1 |
| 1 | 22.2 | 26.4 | 46.9 |
| 2 | 23.6 | 29.5 | 49.2 |
| 4 | 33.6 | 44.6 | 68.4 |
| 6 | 49.0 | 68.8 | 95.4 |
| 8 | 73.7 | 112.5 | 131.0 |
| 10 | 91.5 | 142.1 | 172.1 |

*Immediate flocculation which does not occur for KCl alone
**Flocculation before addition of NaOH

TABLE 5

Example of NaOH—KCl Synergism on
Low Swelling Shales
5% Shale Concentration
Shaftesbury Shale

| pH | % KCl | CST, sec. |
|---|---|---|
| — | 0 | 38.0 |
| — | 1 | 31.7 |
| — | 2 | 29.4 |
| — | 3 | 24.9 |
| 7.9 | 4 | 24.4 |
| 8.5 | 4 | 25.3 |
| 9.2 | 4 | 26.9 |
| 10.0 | 4 | 23.5 |
| 10.8 | 4 | 23.5* |
| 11.5 | 4 | 20.1* |
| 12.2 | 4 | 18.6* |
| 13.0 | 4 | 17.4* |
| 13.5 | 4 | 16.9* |

*Strong coagulation

TABLE 6

KCl - Polymer Synergism Using Capillary
Suction Time Measurements
1% Wyoming Bentonite

| | CST, seconds | |
|---|---|---|
| % KCl | No Polymer | 0.021% Polyacrylamide |
| 0 | 212.9 | 517.4 |
| 2 | 138.6 | 70.7 |
| 4 | 48.9 | 7.1(2) |
| 6 | 32.6 | 6.2 |
| 8 | 26.2 | 5.6 |
| 10 | 22.8(1) | 6.2 |
| 12 | 23.3 | — |

(1)Need 10% KCl for swelling inhibition
(2)Strong flocculation. Need only 4% KCl for swelling and dispersion inhibition.

TABLE 7

Effect of pH (NaOH) on the Zeta Potential of Rev-Dust
0.05% Rev-Dust

| Distilled Water | | Tap Water | |
|---|---|---|---|
| pH | Z.P., millivolts | pH | Z.P., millivolts |
| 8.25 | −11.4 | 7.4 | −20.9 |
| 9.0 | −15.2 | 8.55 | −19.8 |
| 10.0 | −18.4 | 9.6 | −14.6 |
| 10.7 | −21.9 | 10.8 | +0.7 |
| 11.2 | −21.3 | 11.85 | +10.9* |
| 11.9 | −24.2 | | |
| 12.55 | −4.3* | | |

*Coagulated

TABLE 8

Effect of pH (NaOH) on the Capillary Suction
Time of Rev-Dust
5% Rev-Dust

| % NaOH | pH | CST, seconds |
|---|---|---|
| 0 | 7.8 | 164.5 |
| 0.25 | 12.5 | 74.9 |
| 0.5 | 12.9 | 72.4 |
| 1 | 13.3 | 70.0 |
| 2 | 13.6 | 83.6 |
| 4 | 13.8 | 98.3 |
| 6 | 13.85 | 140.5 |
| 8 | — | 178.6 |

TABLE 9

Effect of CaCl$_2$ on the Capillary
Suction Time of Shales
5% Shale Concentration in Tap Water

| grams | CST, seconds | | |
|---|---|---|---|
| CaCl$_2$.2H$_2$O | Shaftesbury | Atoka | Marine |
| 0 | 16.3 | 41.7 | 68.0 |
| 1 | 14.9 | 21.3 | 35.8 |
| 2 | 15.1 | 20.6 | 33.7 |
| 3 | 15.3 | 21.8 | 32.0 |
| 4 | — | 23.9 | 31.7 |
| 5 | 15.8 | 23.0 | — |
| 6 | — | — | 30.2 |
| 8 | — | — | 32.4 |

I claim:

1. A method of formulating an aqueous medium to minimize the swelling and dispersion of subterranean formation particles contacted by said medium which comprises:
    (a) exposing said particles to aqueous solutions containing various concentrations of a compound which inhibits the swelling or dispersion of shales;
    (b) measuring the capillary suction time of said exposed particles in said solutions;
    (c) determining the concentration range of said compound sufficient to minimize the capillary suction time of said exposed particles;
    (d) immersing said particles in aqueous solutions having a pH in the range from about 8 to about 13;
    (e) measuring the capillary suction time of said immersed particles in said solutions;
    (f) determining the pH range sufficient to minimize the capillary suction time of said immersed particles; and
    (g) utilizing said concentration range of said compound and said pH range to formulate said aqueous medium.

2. The method of claim 1 wherein said compound is a water soluble salt.

3. The method of claim 2 wherein said salt has a cation selected from the group consisting of potassium, calcium, and mixtures thereof.

4. The method of claim 1 wherein said pH is provided by a base having a cation selected from the group consisting of sodium, potassium, calcium, ammonium, and mixtures thereof.

5. The method of claim 1 wherein said compound is a water soluble potassium salt.

6. The method of claim 5 wherein said compound is a water soluble polymer.

7. The method of claim 1 wherein said pH is provided by sodium hydroxide or potassium hydroxide.

8. The method of claim 1 wherein said pH is provided by potassium hydroxide.

9. In a method of drilling a well in which an aqueous fluid is circulated throughout a borehole while simultaneously or periodically rotating a string of drill pipe containing a rotary drill bit on its lower end in contact with the bottom of the borehole, the improvement which comprises utilizing an aqueous fluid in which the aqueous medium is formulated according to claim 1.

* * * * *